United States Patent
Hatanaka et al.

(10) Patent No.: US 9,155,239 B2
(45) Date of Patent: Oct. 13, 2015

(54) AGRICULTURAL TRACTOR

(75) Inventors: Kenichi Hatanaka, Osaka (JP); Koji Yamaguchi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/382,994

(22) PCT Filed: Aug. 29, 2012

(86) PCT No.: PCT/JP2012/071808
§ 371 (c)(1),
(2), (4) Date: Sep. 4, 2014

(87) PCT Pub. No.: WO2013/132678
PCT Pub. Date: Sep. 12, 2013

(65) Prior Publication Data
US 2015/0041228 A1 Feb. 12, 2015

(30) Foreign Application Priority Data

Mar. 9, 2012 (JP) .................................. 2012-052725
Jul. 5, 2012 (JP) .................................. 2012-151242

(51) Int. Cl.
*A01B 63/10* (2006.01)
*A01B 59/06* (2006.01)
*B62D 49/06* (2006.01)

(52) U.S. Cl.
CPC ............ *A01B 63/1006* (2013.01); *A01B 59/068* (2013.01); *B62D 49/065* (2013.01)

(58) Field of Classification Search
USPC .................. 180/53.8, 53.3; 172/398, 439, 457
See application file for complete search history.

(56) References Cited

U.S. PATENT DOCUMENTS

| | | | | | |
|---|---|---|---|---|---|
| 2,775,176 | A | * | 12/1956 | Gibson | 172/460 |
| 3,078,930 | A | * | 2/1963 | Foote | 172/491 |
| 3,517,943 | A | * | 6/1970 | Lind et al. | 280/405.1 |
| 4,058,180 | A | * | 11/1977 | Dreyer | 180/53.3 |
| 4,234,129 | A | * | 11/1980 | Dreyer | 239/661 |

(Continued)

FOREIGN PATENT DOCUMENTS

| | | | |
|---|---|---|---|
| JP | 2-120110 U | * | 9/1990 |
| JP | 9-109710 | | 4/1997 |

(Continued)

*Primary Examiner* — Paul N Dickson
*Assistant Examiner* — Darlene P Condra
(74) *Attorney, Agent, or Firm* — Jordan and Hamburg, LLP

(57) ABSTRACT

An agricultural tractor seeks to simplify a shaft support structure in a lower portion side of an elevating hydraulic cylinder which is externally installed to a rear side of a transmission case. The agricultural tractor of the present invention is provided with a travel machine body to which an engine and the transmission case are mounted, a lift arm which is provided in a rear portion side of an upper surface of the transmission case so as to freely oscillate up and down, the elevating hydraulic cylinder which oscillates up and down the lift arm, and rear axle cases which protrude laterally outward from the transmission case. An upper portion side of the elevating hydraulic cylinder is connected to the lift arm, and a lower portion side of the elevating hydraulic cylinder is supported to the travel machine body. The lower portion side of the elevating hydraulic cylinder is axially supported rotatably via a laterally directed pivot pin shaft by a hitch portion which is integrally formed in at least one of the right and left rear axle cases so as to protrude backward, and a bracket portion which is integrally formed in a rear surface of the transmission case so as to protrude backward.

1 Claim, 11 Drawing Sheets

(56) References Cited

U.S. PATENT DOCUMENTS

| | | | | |
|---|---|---|---|---|
| 4,279,084 A | * | 7/1981 | Low et al. | 37/236 |
| 4,452,496 A | * | 6/1984 | van der Lely | 305/15 |
| 5,423,394 A | * | 6/1995 | Kendle | 180/53.3 |
| 6,991,042 B2 | * | 1/2006 | Ochi et al. | 172/439 |
| 7,658,235 B2 | * | 2/2010 | Dahl et al. | 172/449 |

FOREIGN PATENT DOCUMENTS

| | | |
|---|---|---|
| JP | 2002-204604 | 7/2002 |
| JP | 2003-088207 | 3/2003 |

* cited by examiner

# AGRICULTURAL TRACTOR

TECHNICAL FIELD

The present invention relates to an agricultural tractor in which a ground working machine is installed to a rear side of a travel machine body by a lift arm so as to freely elevate.

BACKGROUND OF THE INVENTION

An agricultural tractor is conventionally provided with a travel machine body to which an engine and a transmission case are mounted, a lift arm which is arranged in an upper surface side of a rear portion of the transmission case so as to freely oscillate up and down, and an elevating hydraulic cylinder which oscillates up and down the lift arm, and the elevating hydraulic cylinder for driving the lift arm is outward installed to the rear side of the transmission case (refer, for example, to patent document 1).

CITATION LIST

Patent Document 1: Japanese Unexamined Patent Application Publication No. 09-109710

SUMMARY OF THE INVENTION

In the meantime, in the case that the elevating hydraulic cylinder is assembled in the patent document 1, an upper portion side of the elevating hydraulic cylinder is connected to a midstream portion of the lift arm by a cantilever straight pin. On the other hand, a lower portion side of the elevating hydraulic cylinder is connected to a rear portion of the transmission case by fastening by bolts an attaching plate provided in one end side of a cylinder pin to a thick base plate of a rear axle case, inserting the cylinder pin to an end portion closer to the cylinder side in the elevating hydraulic cylinder, thereafter assembling a support bracket to the other end side of the cylinder pin, and fastening by bolts the assembled support bracket to a rear surface portion of the transmission case. As a result, a number of parts constructing an axial support structure in the lower portion side of the elevating hydraulic cylinder is increased, and an assembling work man hour is increased, thereby causing a manufacturing cost rise.

A technical object of the present invention is to provide an agricultural tractor to which an improvement is applied by making a study of the actual condition as mentioned above.

The invention according to a first aspect is an agricultural tractor including a travel machine body to which an engine and a transmission case are mounted, a lift arm which is provided in a rear portion side of an upper surface of the transmission case so as to freely oscillate up and down, an elevating hydraulic cylinder which oscillates up and down the lift arm, rear axle cases which protrude laterally outward from the transmission case, the elevating hydraulic cylinder being connected its upper portion side to the lift arm, and the elevating hydraulic cylinder being supported its lower portion side to the travel machine body, wherein the lower portion side of the elevating hydraulic cylinder is axially supported rotatably via a laterally directed pivot pin shaft by a hitch portion which is integrally formed in at least one of the right and left rear axle cases so as to protrude backward, and a bracket portion which is integrally formed in a rear surface of the transmission case so as to protrude backward.

The invention according to a second aspect is the agricultural tractor described in the first aspect, wherein the hitch portion is formed in the both rear axle cases, and base end sides of a pair of right and left lower links for installing a ground working machine are axially supported rotatably to laterally long sideways lower link pin shaft which is supported to the both hitch portions.

The invention according to a third aspect is the agricultural tractor described in the second aspect, wherein a base end side of a sway chain in relation to each of the lower links is connected to a plate which is attached to a longitudinally midstream portion of the lower link pin shaft.

According to the present invention, in the agricultural tractor including the travel machine body to which the engine and the transmission case are mounted, the lift arm which is provided in the rear portion side of the upper surface of the transmission case so as to freely oscillate up and down, the elevating hydraulic cylinder which oscillates up and down the lift arm, the rear axle cases which protrude laterally outward from the transmission case, the elevating hydraulic cylinder being connected its upper portion side to the lift arm, and the elevating hydraulic cylinder being supported its lower portion side to the travel machine body, the lower portion side of the elevating hydraulic cylinder is axially supported rotatably via the laterally directed pivot pin shaft by the hitch portion which is integrally formed in at least one of the right and left rear axle cases so as to protrude backward, and the bracket portion which is integrally formed in the rear surface of the transmission case so as to protrude backward. As a result, the lower portion side of the elevating hydraulic cylinder can be easily connected to the rear portion side of the transmission case only by inserting and fixing the pivot pin shaft to the hitch portion of the rear axle case, the lower portion side of the elevating hydraulic cylinder, and the bracket portion of the transmission case. Therefore, it is possible to reduce a number of parts constructing the axial support structure in the lower portion side of the elevating hydraulic cylinder so as to reduce an assembling work man hour, and it is possible to achieve an effect of helping suppression of a manufacturing cost and suppression of a maintenance cost.

Particularly, according to the invention of the second aspect, the hitch portion is formed in the both rear axle cases, and the base end sides of a pair of right and left lower links for installing the ground working machine are axially supported rotatably to the laterally long sideways lower link pin shaft which is supported to the both hitch portions. As a result, a structure for attaching and supporting both the lower links can be simplified, and it is possible to achieve an effect of improving a workability of attaching and detaching both the lower links and further the ground working machine installed to both the lower links.

Further, according to the invention of the third aspect, the base end side of the sway chain in relation to each of the lower links is connected to the plate which is attached to the longitudinally midstream portion of the lower link pin shaft. As a result, the sway chain is positioned between both the lower links. Therefore, there is no risk that the sway chain restricting the oscillation in the lateral direction of the lower link interferes with the rear wheel or the like, and there is an advantage that the existence of the sway chain does not get in the way.

DESCRIPTION OF THE PREFERRED EMBODIMENTS

Figure 1:
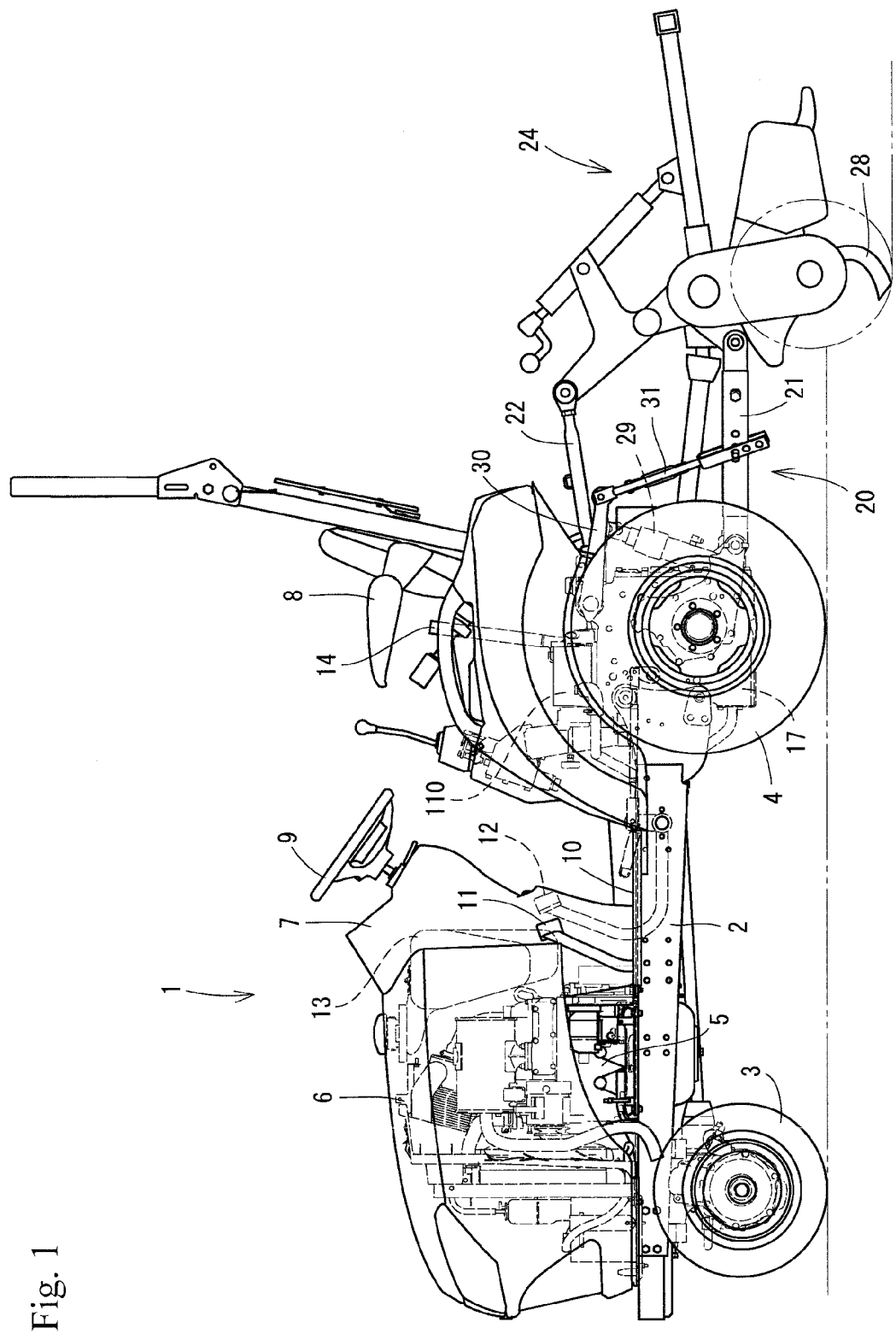
FIG. 1 is a side elevational view of an agricultural tractor.
Figure 2:
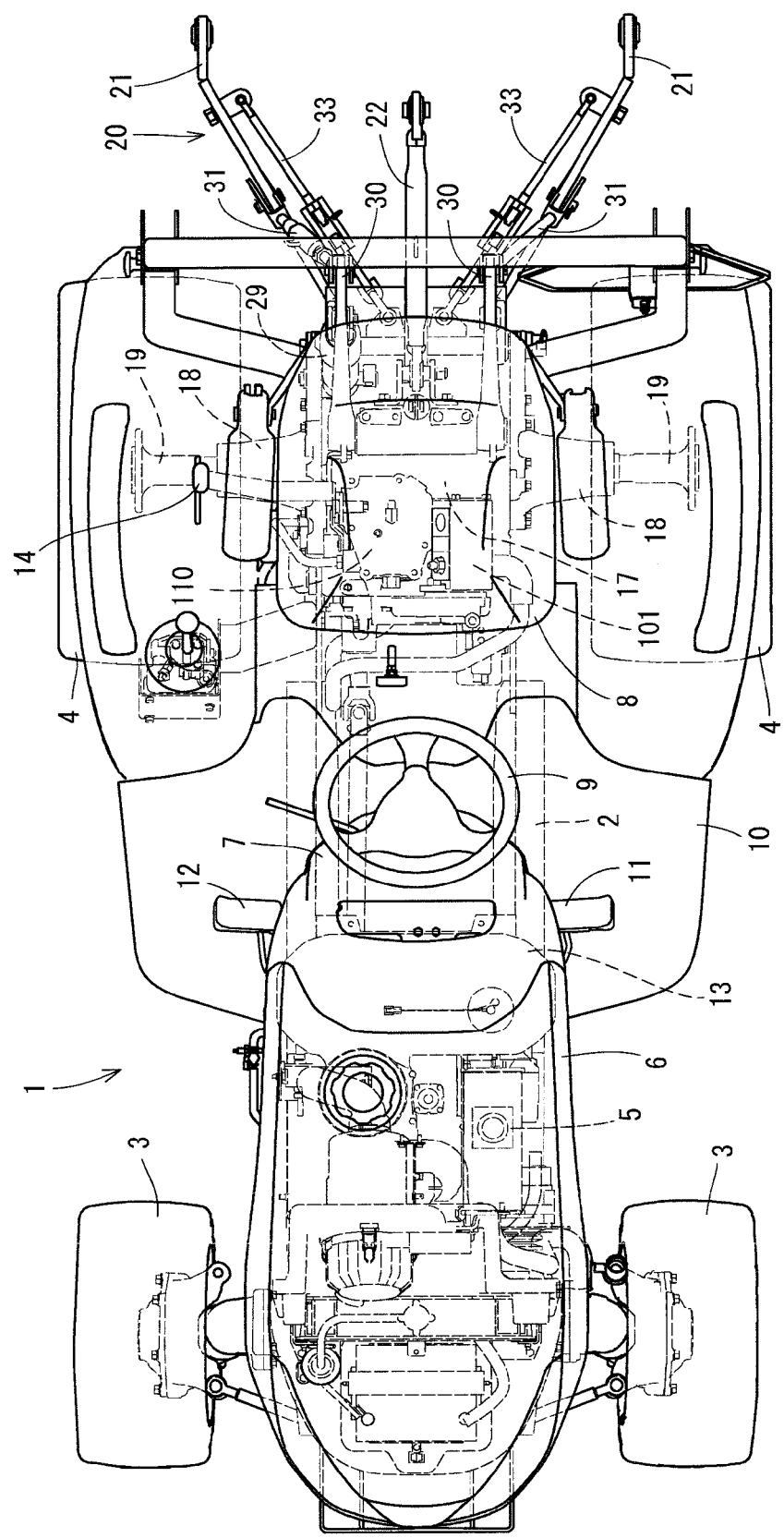
FIG. 2 is a plan view of the agricultural tractor.

A description will be given below of an embodiment obtained by embodying the present invention with reference to the accompanying drawings (FIGS. 1 to 11). As shown in FIGS. 1 and 2, an agricultural tractor 1 (hereinafter, refer simply to as a tractor 1) supports a travel machine body 2 by a pair of right and left front wheels 3 and a pair of right and left rear wheels 4. In the following description, a left side in the direction of a forward moving direction of the travel machine body 2 is simply called as a left side, and a right side in the direction of the forward moving direction is simply called as a right side. The tractor 1 is structured such as to travel forward and backward by driving the rear wheels 4 and the front wheels 3 by an engine 5 which is mounted to a front portion of the travel machine body 2. The engine 5 is covered by a hood 6. A fuel tank 13 is arranged in a rear side of the engine 5. The fuel tank 13 is covered by the hood 6.

Further, a steering wheel column 7 is arranged in a rear portion of the hood 6. A control steering wheel 9 is provided in the steering wheel column 7, the control steering wheel 9 steering the right and left front wheels 3 to the right and left. A control seat 8 is arranged in a rear side of the control steering wheel 9 on an upper surface of the travel machine body 2. A working machine elevating lever 14 is arranged in a right side portion of the control seat 8, the working machine elevating lever 14 manually changing and adjusting a height position of a rotary tiller 24 mentioned later. The working machine elevating lever 14 is structured such as to move down the rotary tiller 24 on the basis of a forward tilting operation and move up the rotary tiller 24 on the basis of a rearward tilting operation.

A step 10 is provided in a lower portion of the steering wheel column 7, the step 10 on which an operator gets. A clutch pedal 11 is provided in a left side of the steering wheel column 7 on an upper surface of the step 10, and a brake pedal 12 is provided in a right side of the steering wheel column 7. The operator seating on the control seat 8 grips the control steering wheel 9, and foot controls the clutch pedal 11 and the brake pedal 12.

On the other hand, a transmission case 17 is arranged in a rear portion of the travel machine body 2 for transmitting rotation of the engine 5 to the right and left rear wheels 4 and front wheels 3 in a speed changing manner. Right and left rear axle cases 18 are installed so as to protrude outward from right and left outer surfaces of the transmission case 17. Right and left rear axles 19 are inward inserted to the right and left rear axle cases 18. The rear wheels 4 are attached to the transmission case 17 via the rear axles 19.

Further, a rear PTO shaft 23 is provided in a rear side surface of the transmission case 17 so as to protrude backward, the rear PTO shaft 23 being provided for transmitting PTO drive force rearward. The tractor 1 according to the embodiment is provided with the rotary tiller 24 which serves as a ground working machine, and a three-point link mechanism 20 which is connected to a rear portion of the travel machine body 2. The three-point link mechanism 20 is constructed by a pair of right and left lower links 21 and a top link 22. The rotary tiller 24 is connected to a rear portion of the transmission case 17 via the three-point link mechanism 20.

Figure 3:
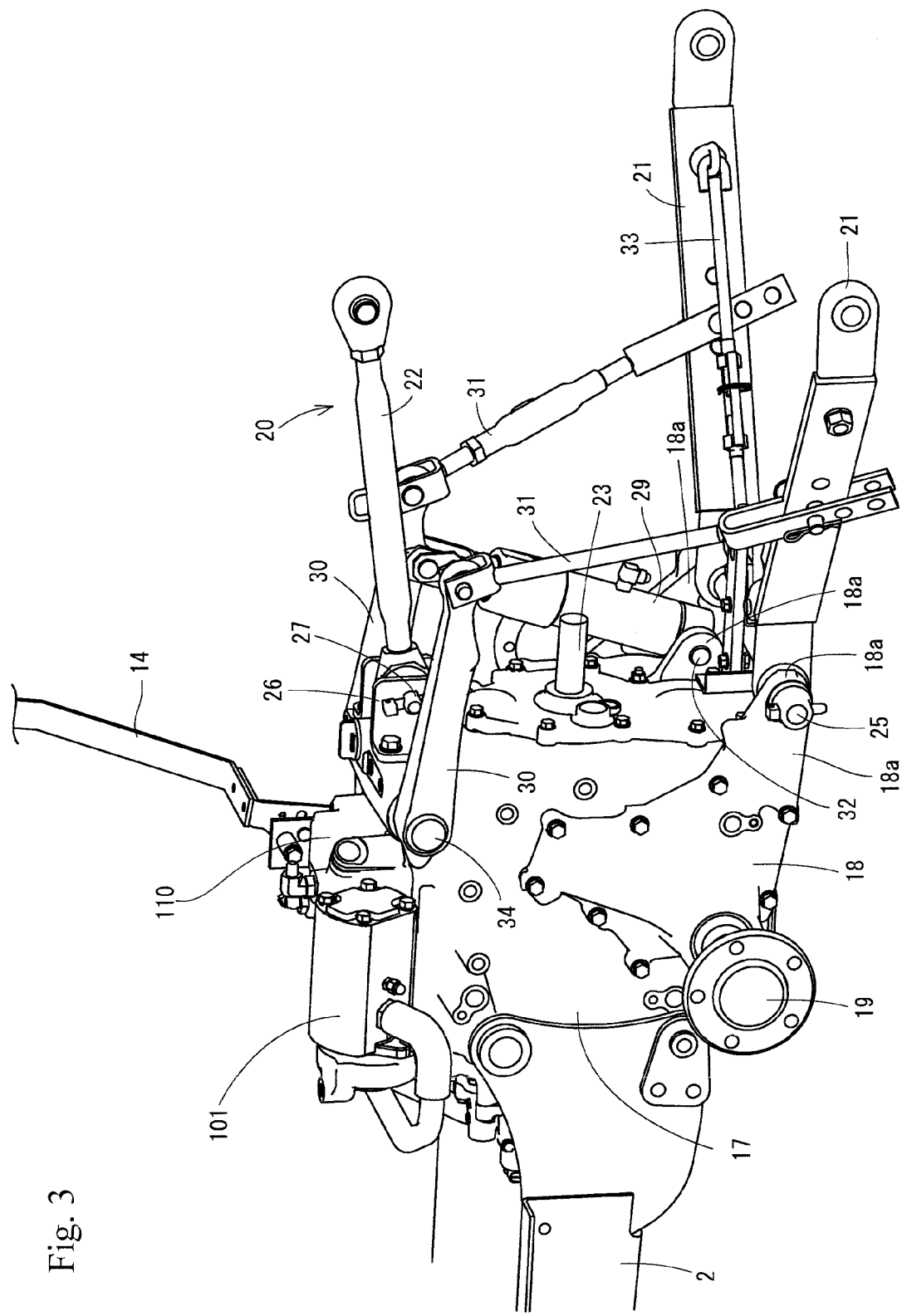
FIG. 3 is a perspective view of a transmission case as seen from a left rear side.
Figure 4:
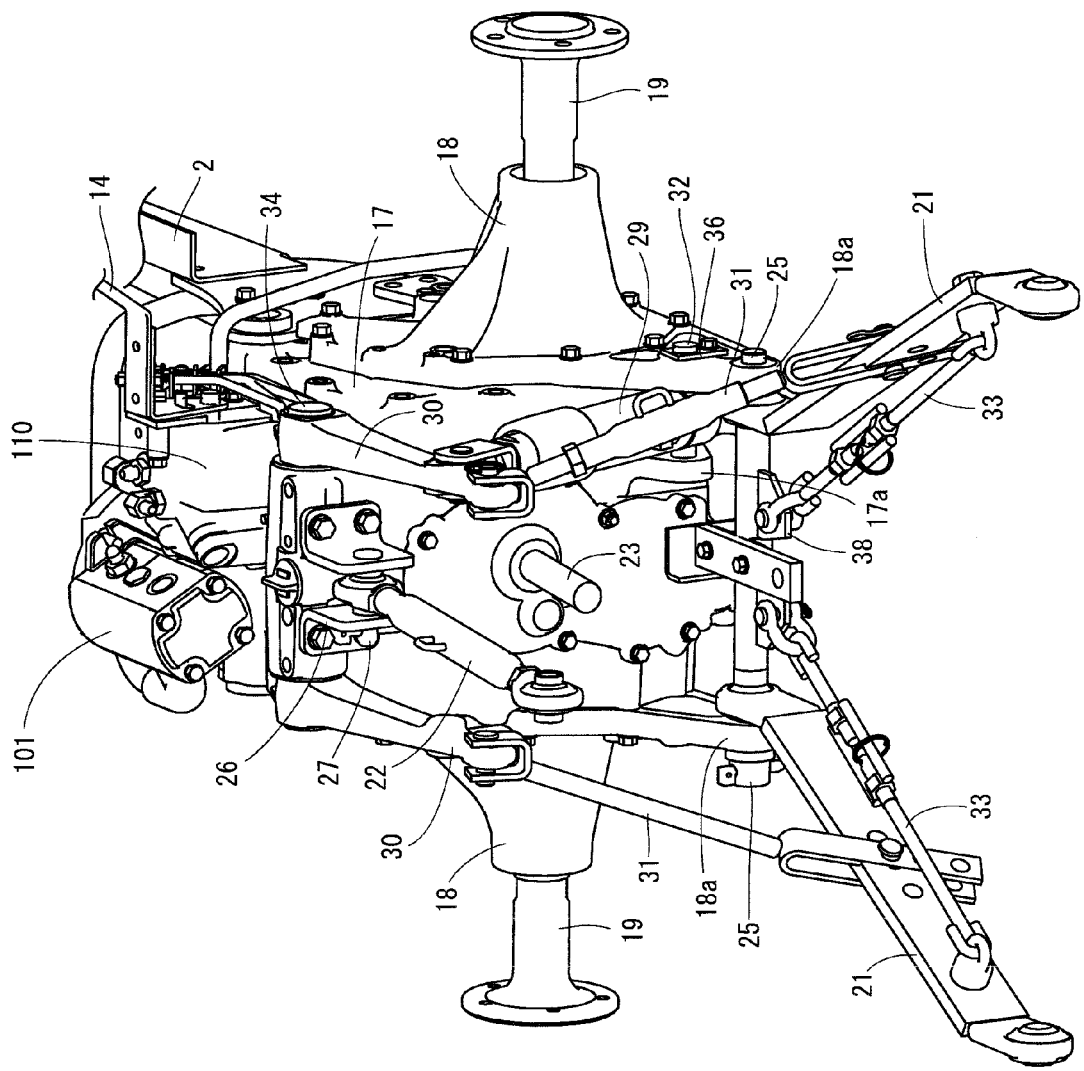
FIG. 4 is a perspective view of the transmission case as seen from a right rear side.

As shown in FIGS. 3 and 4, front end sides (base end sides) of the right and left lower links 21 are rotatably connected to hitch portions 18*a* in rear end portions of the rear axle cases 18 via a laterally long sideways lower link pin shaft 25. A front end side of the top link 22 is connected to a link hitch 26 in a rear surface side of the transmission case 17 via a top link pin 27. Front end sides (base end sides) of sway chains 33 are connected to an intermediate portion of the lower link pin shaft 25, the sway chain 33 regulating oscillation in a lateral direction of the lower link 21 (refer to FIGS. 3 to 5). The tractor 1 is structured such as to execute a tilling work of a farm field by rotating rotary tilling claws 28 of the rotary tiller 24 on the basis of a power from the rear PTO shaft 23 while towing the rotary tiller 24 in the rear side of the tractor 1 by the three-point link mechanism 20 which is constructed by a pair of right and left lower links 21 and the top link 22.

The tractor 1 according to the embodiment is provided with a single acting type elevating hydraulic cylinder 29 as an actuator which elevates the three-point link mechanism 20. Right and left lift arms 30 are provided in a rear portion side of an upper surface of the transmission case 17 via a lift arm shaft 34 (a rotating motion supporting point portion) so as to freely oscillate (rotate) up and down. The right and left lower links 21 are connected to the respective lift arms 30 via lift rods 31. A piston rod (an upper portion side) of an elevating hydraulic cylinder 29 is connected to at least one of the right and left lift arms 30 (the right lift arm in the embodiment) via a laterally directed cylinder connection pin 35.

A cylinder side end portion (a lower portion side) of the elevating hydraulic cylinder 29 is supported to the travel machine body 2 (the rear portion side of the transmission case 17) via a laterally directed cylinder support pin 32 (a pivot pin shaft). In this case, the elevating hydraulic cylinder 29 is supported to a bracket portion 17*a* which is integrally formed in a rear surface side of the transmission case 17, and a hitch portion 18*a* which is integrally formed in rear end portions of the right and left axle cases 18, via the cylinder support pin 32 which serves as the pivot pin shaft (refer to FIGS. 3 to 5).

In other words, the lower portion side of the elevating hydraulic cylinder 29 is arranged between the hitch portion 18*a* which is integrally formed in at least one of the right and left rear axle cases 18 (the right rear axle case in the embodiment) so as to protrude backward, and the bracket portion 17*a* which is integrally formed in the rear surface of the transmission case 17 so as to protrude backward. The cylinder support pin 32 is passed through the hitch portion 18*a*, the lower portion side of the elevating hydraulic cylinder 29, and the bracket portion 17*a*, and the cylinder support pin 32 is supported to the hitch portion 18*a* and the bracket portion 17*a* in a both-end supported state. A fixing plate 36 is provided in a protruding end portion which protrudes to a laterally outer side of the hitch portion 18*a* in the cylinder support pin 32. The cylinder support pin 32 is retained so as to be prevented from coming off, by fastening by bolts the fixing plate 36 to the outer side surface of the hitch portion 18*a*.

The bracket portion 17*a* according to the embodiment is provided between the rear PTO shaft 23 in the rear surface of the transmission case 17 and the hitch portion 18*a* of the rear axle case 18 so as to protrude backward. As a result, the elevating hydraulic cylinder 29 is arranged in an offset state so as to be shifted to any side (a side having the bracket portion 17a) from the lateral center of the travel machine body 2 at which the rear PTO shaft 23 is positioned.

As mentioned above, in the case that the cylinder support pin 32 is inserted and fixed to the hitch portion 18a of the rear axle case 18, the lower portion side of the elevating hydraulic cylinder 29, and the bracket portion 17a of the transmission case 17, the lower portion side of the elevating hydraulic cylinder 29 can be easily connected to the rear portion side of the transmission case 17. Therefore, it is possible to reduce a number of parts constructing the axial support structure in the lower portion side of the elevating hydraulic cylinder 29 so as to reduce an assembling work man hour, and it is possible to help suppression of a manufacturing cost and suppression of a maintenance cost.

In the case that the elevating hydraulic cylinder 29 is activated on the basis of the manual operation of the working machine elevating lever 14, and the piston rod thereof is protruded and immersed, leading end sides (rear end sides) of the right and left lift arms 30 oscillate (rotate) in a vertical direction, and rotate the rear end sides of the right and left lower links 21 around the lower link pin shaft 25 as a supporting point in the vertical direction. As a result, the rotary tiller 24 connected to the rear end sides of both the right and left lower links 21 elevates.

Figure 5:
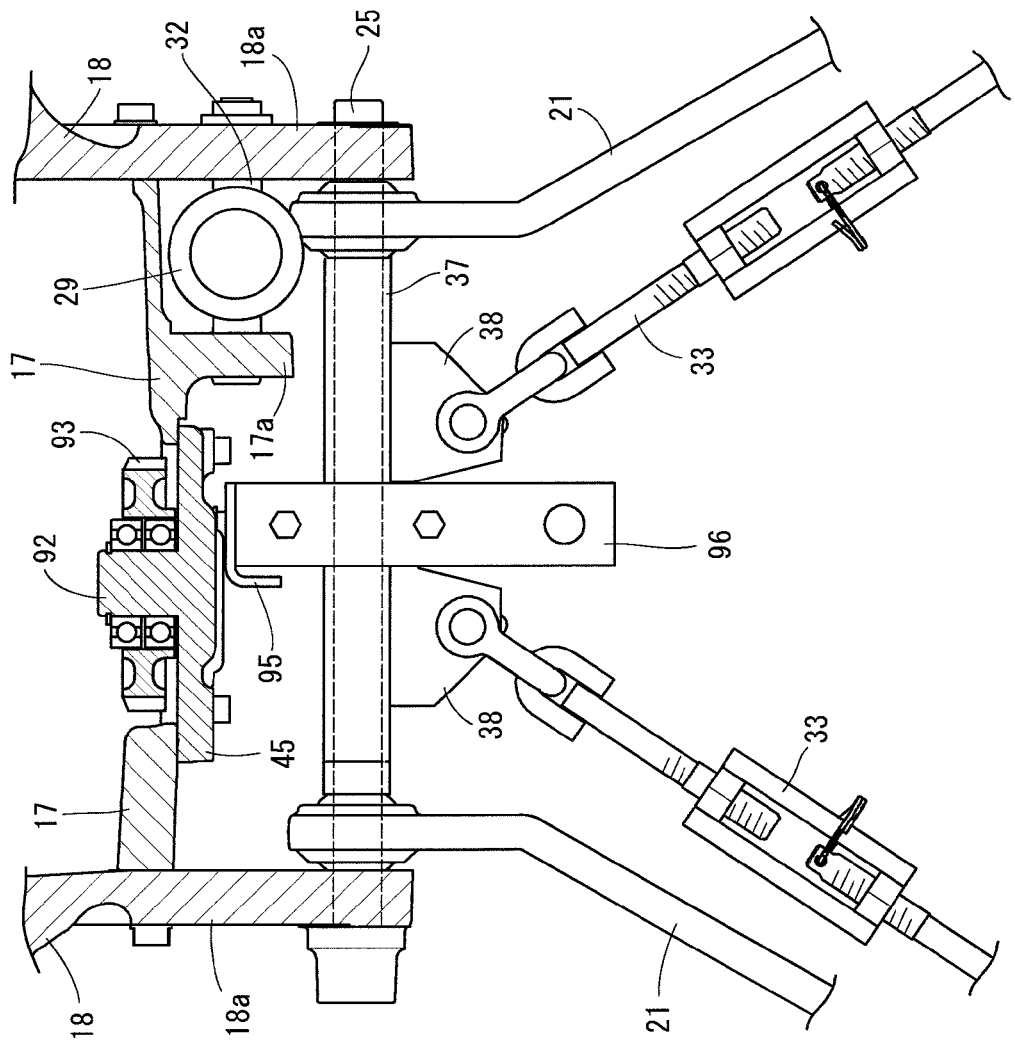
FIG. 5 is a plan cross sectional view of a rear portion of the transmission case.
Figure 6:
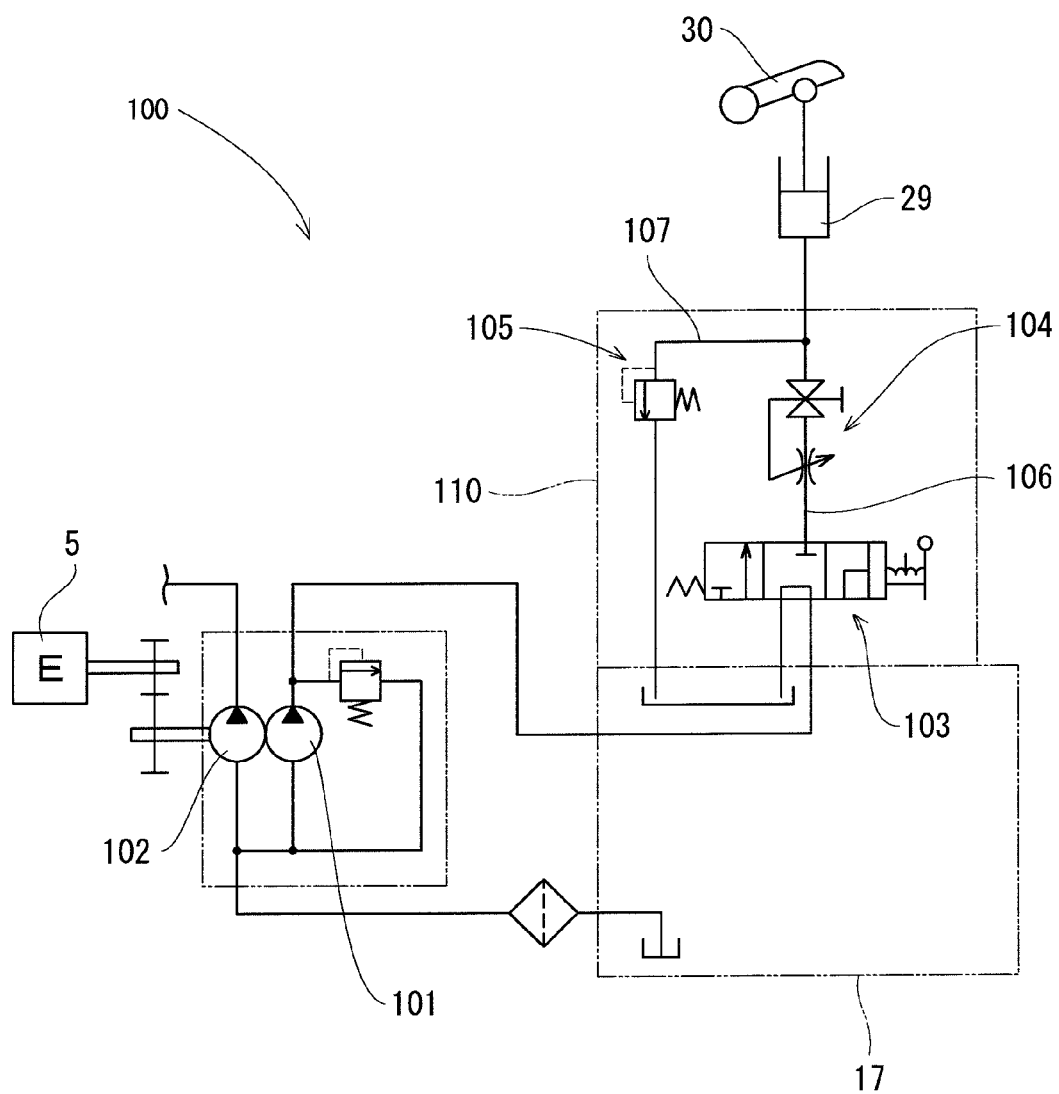
FIG. 6 is a hydraulic circuit diagram of the agricultural tractor.

As shown in FIGS. 3 to 5, the hitch portion 18a according to the embodiment is integrally formed in both the right and left rear axle cases 18 so as to protrude backward. The laterally long sideways lower link pin shaft 25 is attached to both the right and left hitch portions 18a so as to be inserted and extracted laterally. A front end side (base end side) of each of the lower links 21 is rotatably fitted to a laterally inner side close to each of the hitch portions 18a in the lower link pin shaft 25. According to the structure mentioned above, the front end sides of both the right and left lower links 21 can be axially supported only by the single lower link pin shaft 25 so as to be rotatable, and it is possible to simplify the attaching and supporting structure of both the right and left lower links 21. In addition, both the right and left lower links 21 can be simply detached from the rear portion of the travel machine body 2 by extracting the lower link pin shaft 25 from both the right and left hitch portions 18a. Accordingly, it is possible to improve an attaching and detaching workability of both the right and left lower links 21 and further the rotary tiller 24 (the ground working machine) which is installed to the lower links 21.

A tubular body 37 controlling a lateral movement of the front end sides of both the right and left lower links 21 is fitted to a longitudinally midstream portion of the lower link pin shaft 25. A rear hitch 96 is fixed to a center portion of the tubular body 37. The rear hitch 96 is also fixed to a rear surface of the transmission case 17 via a hitch bracket 95. Plates 38 protruding backward are attached to both right and left sides of the rear hitch in the tubular body 37. A front end side (a base end side) of the sway chain 33 controlling the oscillation in the lateral direction of the lower link 21 is connected to each of the plates 38. A rear end side (a leading end side) of the sway chain 33 is connected to a lateral inner surface side closer to the leading end of the corresponding lower link 21. According to the structure mentioned above, each of the sway chains 33 is positioned between both the right and left lower links 21. Therefore, there is no risk that the sway chains 33 controlling the oscillation in the lateral direction of the respective lower links 21 interfere with the rear wheels 4 existing in the right and left outer sides of the transmission case 17, and the existence of the sway chains 33 does not get in the way.

Figure 7:
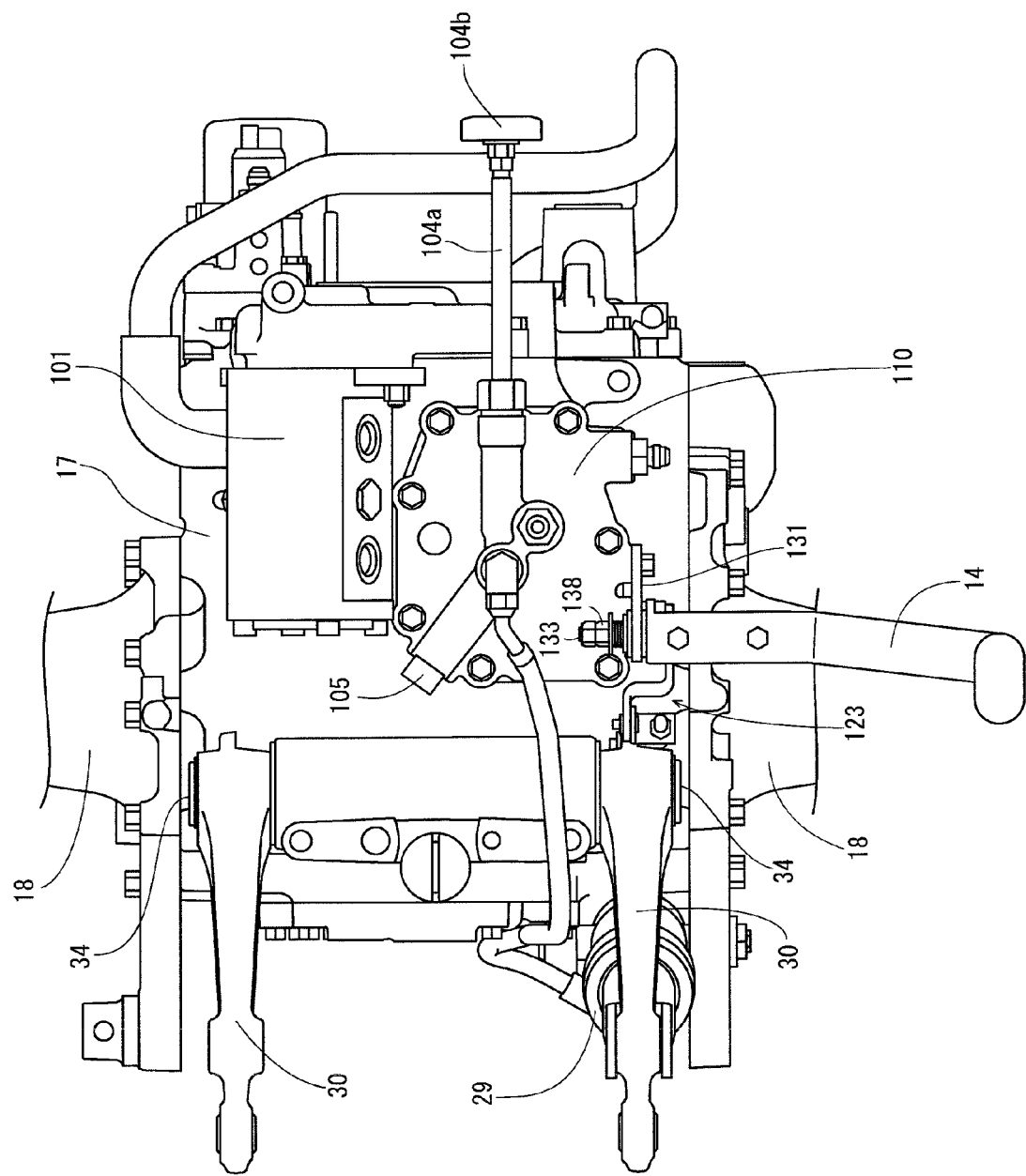
FIG. 7 is a plan view of the transmission case and a hydraulic case.
Figure 8:
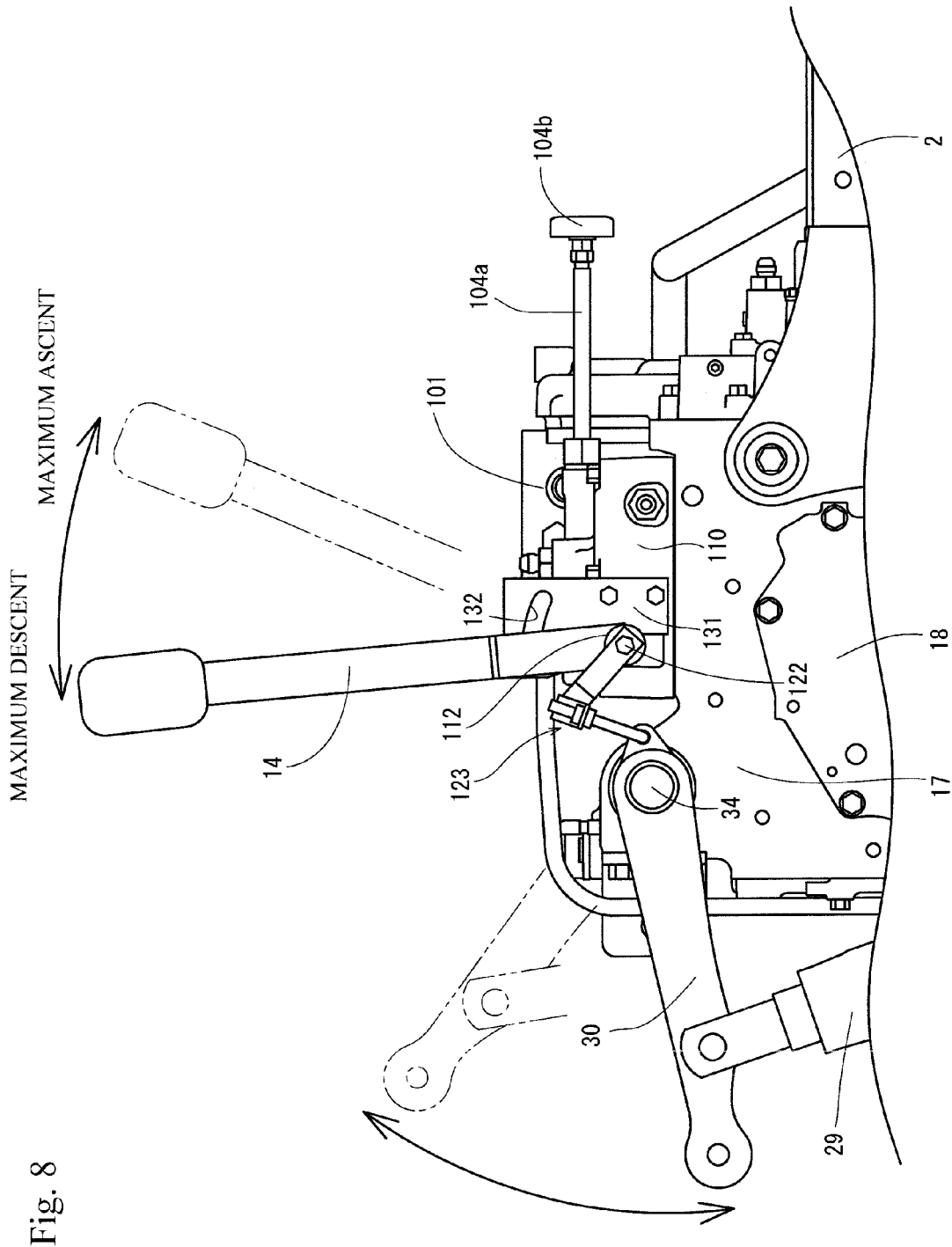
FIG. 8 is a side elevational view of the hydraulic case.

Next, a description will be given of a structure of a hydraulic circuit 100 of the tractor 1 with reference to FIGS. 6 to 11. The hydraulic circuit 100 of the tractor 1 is provided with a working hydraulic pump 101 and a charging hydraulic pump 102 which are driven by the power of the engine 5. The working hydraulic pump 101 is connected to an elevating hydraulic switch valve 103 which controls supply and discharge of a working fluid in relation to the elevating hydraulic cylinder 29. The elevating hydraulic switch valve 103 is accommodated within a hydraulic case 110 which is detachably provided on an upper surface of the transmission case 17 (refer to FIGS. 9 to 11). In the case that the working machine elevating lever 14 is manually controlled, the elevating hydraulic switch valve 103 is switched so as to expand and contract the elevating hydraulic cylinder 29. As a result, the lift arm 30 rotates up and down and the rotary tiller 24 elevates via the three-point link mechanism 20. As shown in FIG. 7, the working hydraulic pump 101 is positioned in a left side of the hydraulic case on the upper surface of the transmission case 17. In other words, the working hydraulic pump 101 is provided in an opposite side to the working machine elevating lever 14 and a feedback link 123 (details of which will be mentioned later) in relation to the hydraulic case 110 on the upper surface of the transmission case 17.

Figure 9:
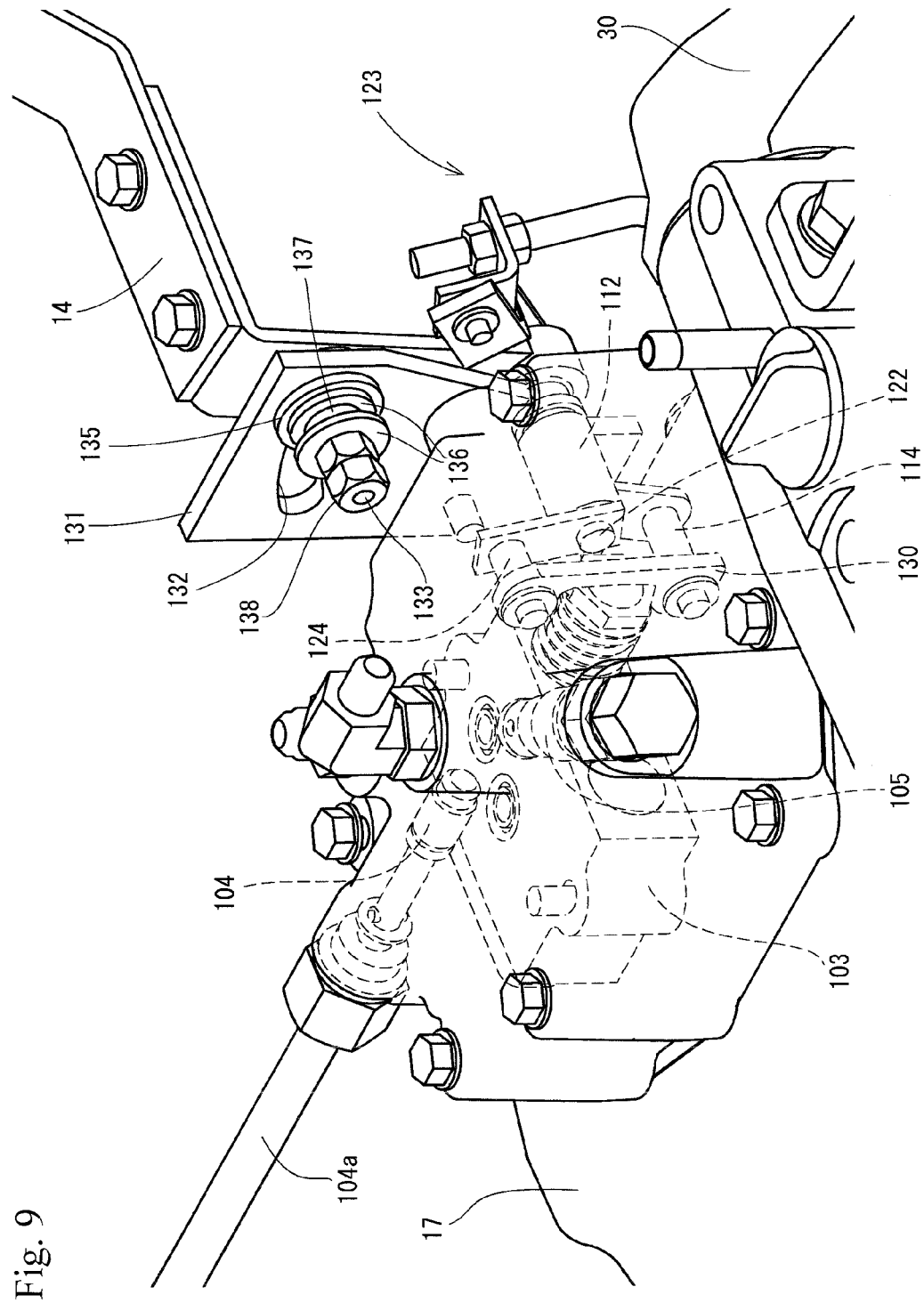
FIG. 9 is a perspective view of a rear side of the hydraulic case.
Figure 10:
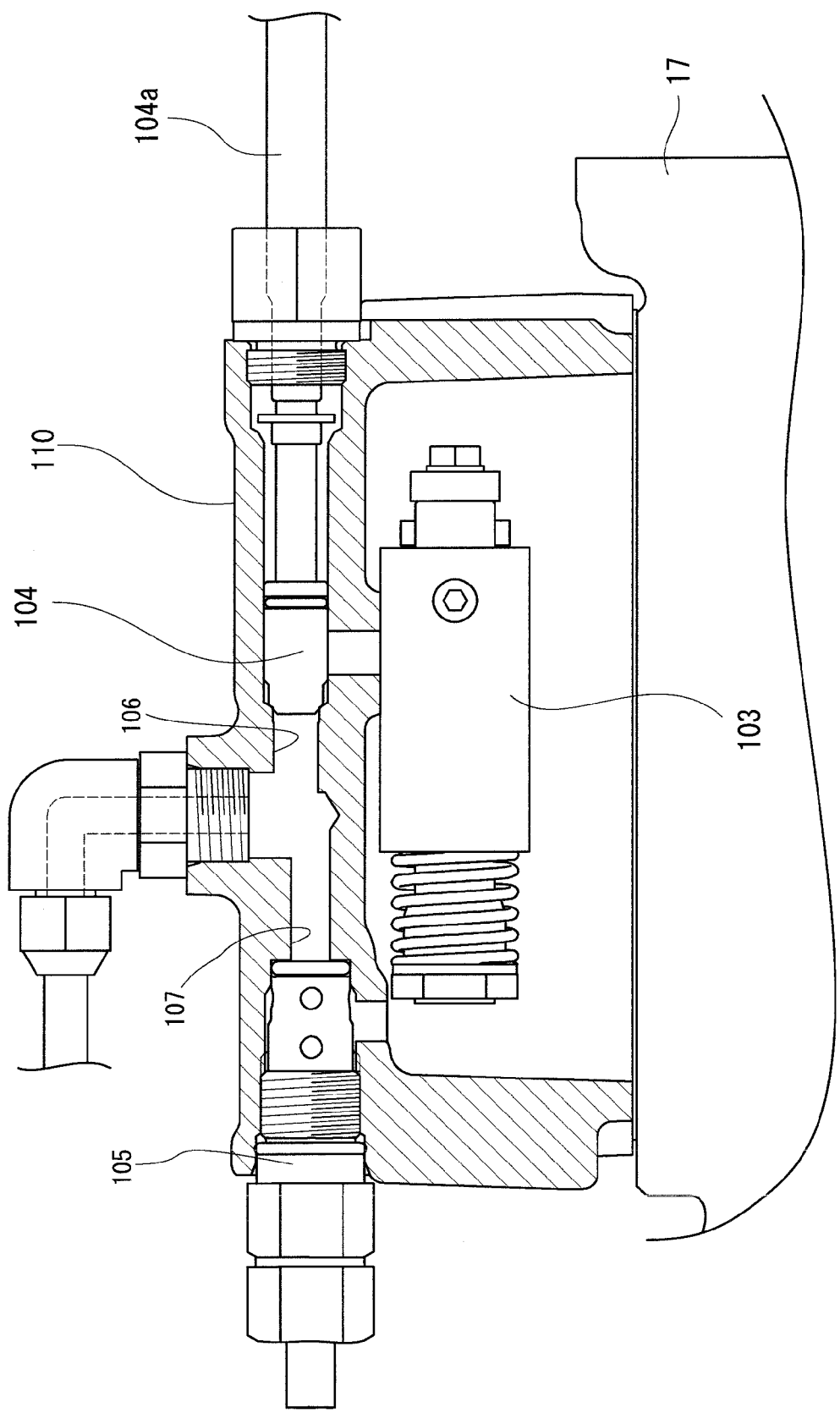
FIG. 10 is a cross sectional view of a side surface of the hydraulic case.
Figure 11:
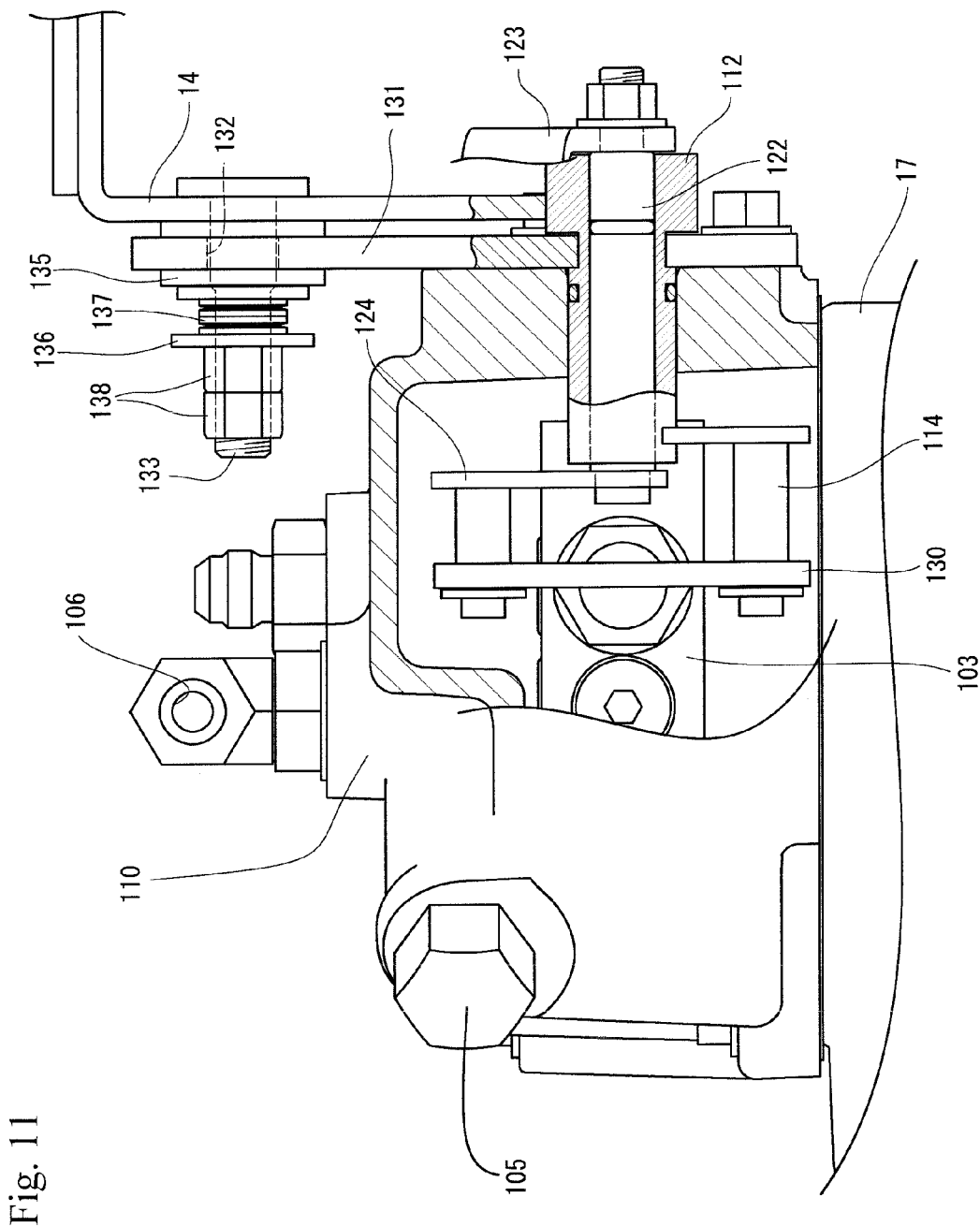
FIG. 11 is a partly notched back elevational view of the hydraulic case.

A variable throttle and stop valve 104 is provided in a working fluid passage 106 which connects the elevating hydraulic switch valve 103 and the elevating hydraulic cylinder 29, the variable throttle and stop valve 104 adjusting a shortening speed of the elevating hydraulic cylinder 29 (which may be called as a falling speed of the lift arm 30). As shown in FIG. 9, the working fluid passage 106 is formed in an upper surface side of the hydraulic case 110. The variable throttle and stop valve 104 is detachably installed to a front portion side of an upper surface of the hydraulic case 110. An operating rod 104a of the variable throttle and stop valve 104 protruded forward from a front surface side of the hydraulic case 110. An adjustment knob 104b attached to a leading end side of the operating rod 104a is positioned in a downward front portion of the control seat 8. The variable throttle and stop valve 104 is adjusted via the operating rod 104a on the basis of a rotating operation of the adjustment knob 104b.

A branch oil passage 107 is connected between the variable throttle and stop valve 104 and the elevating hydraulic cylinder 29 in the working fluid passage 106. A damage preventing relief valve 105 is provided in the branch oil passage 107 for relieving pressure between the variable throttle and stop valve 104 and the elevating hydraulic cylinder 29 in the working fluid passage 106. For example, in the case that the load applied to the rotary tiller 24 is increased and an unexpected overload is applied to the link arm 30 and further to the elevating hydraulic cylinder 29, the pressure of the working fluid within the working fluid passage 106 becomes too high, and there is a risk that any trouble is caused in the elevating hydraulic cylinder 29, the elevating hydraulic switch valve 103, the variable throttle and stop valve 104, and the like. The damage preventing relief valve 105 is structured such as to relieve the working fluid within the elevating hydraulic cylinder 29 to the transmission case 17 side in the case mentioned above. The overload of the working fluid passage 106 is prevented on the basis of the action of the damage preventing relief valve 105. The damage preventing relief valve 105 is detachably installed to the rear portion side of the upper surface of the hydraulic case 110.

Although an illustration will be omitted, the charging hydraulic pump 102 is structured such as to supply the working fluid to a hydraulic continuously variable transmission, a steering hydraulic cylinder for power steering, and the like which are provided in the transmission case 17. Further, the hydraulic circuit 100 is provided with the other relief valve, an oil filter, and the like.

Next, a description will be given of an elevating mechanism 111 which is provided in the hydraulic case 110 and a peripheral structure of the elevating mechanism 111 with reference to FIGS. 7 to 11. The hydraulic case 110 is provided with an elevating mechanism 111 controlling the drive of the elevating hydraulic cylinder 29. The elevating mechanism 111 is structured such as to mechanically switch the elevating hydraulic switch valve 103 at the manual operating time of the working machine elevating lever 14 which serves as an operation member. In this case, the elevating hydraulic cylinder 29 is expanded and contracted via the elevating hydraulic switch valve 103 and the variable throttle and stop valve 104 on the basis of the manual operation of the working machine elevating lever 14, and the elevating hydraulic switch valve 103 is returned to a neutral position on the basis of the actuation of the feedback link 123 in connection with the expansion and contraction of the elevating hydraulic cylinder 29. As a result, the rotary tiller 24 is retained at an optional tilling height position in correspondence to an amount of the manual operation of the working machine elevating lever 14.

As shown in FIGS. 7 to 9 and 11, the working machine elevating lever 14 is provided in one side of right and left sides (a right side in the embodiment) of the hydraulic case 110 so as to be tiltable (rotatable) back and forth. In this case, a tubular rotary support shaft 112 is fitted to a laterally long sideways feedback operation shaft 122 so as to be relatively rotatable, and the rotary support shaft 112 and the feedback operation shaft 122 are rotatably passed through the right side surface of the hydraulic case 110. The rotary support shaft 112 and the feedback operation shaft 122 form a concentric double shaft structure. The base end side of the working machine elevating lever 14 is fixed by welding to a position which is exposed to a right outer side from the hydraulic case 110 in the rotary support shaft 112. The working machine elevating lever 14 rotates back and forth around the rotary support shaft 112.

A position protruding outward from the rotary support shaft 112 in the feedback operation shaft 122 is connected to the base end side of the right lift arm 30 via the feedback link 123. In the case that the right and left lift arms 30 rotate up and down on the basis of the manual operation of the working machine elevating lever 14, the displacements (phases) of the right and left lift arms 30 are fed back to the feedback operation shaft 122 via the feedback link 123. In other words, the right and left lift arms 30 are rotated up and down following to an operation amount and an operating direction of the working machine elevating lever 14, and the rotary tiller 24 is elevated. As is apparent from the structures of the rotary support shaft 112 and the feedback operation shaft 122, the working machine elevating lever 14 and the feedback link 123 are arranged collectively in one side (the right side in the embodiment) of the right and left sides of the hydraulic case 110. Further, the lift arm shaft 34 and the double shaft structures 112 and 122 are in a mutually close positional relationship, the lift arm shaft 34 being the rotating motion supporting point portion of the lift arm 30, and the double shaft structures 112 and 122 being axially supported to the hydraulic case 110.

A position within the hydraulic case 110 in the rotary support shaft 112 is connected to a lower end side of a seesaw link 130 via a lower interlocking arm 114. On the other hand, an inward protruding position from the rotary support shaft 112 within the hydraulic case 110 in the feedback operation shaft is connected to an upper end side of the seesaw link 130 via an upper interlocking arm 124. A vertically midstream portion of the seesaw link 130 is structured such as to be contactable with a spool of the elevating hydraulic switch valve 103. The elevating hydraulic switch valve 103 is switched by appropriately converting the control force from the working machine elevating lever 14 and the feedback action force from the lift arm 30 so as to transmit to the seesaw link 130. As a result, the elevating hydraulic cylinder 29 can be retained in an optional expansion and contraction state in correspondence to the amount of the manual operation of the working machine elevating lever 14.

As shown in FIGS. 7 to 9 and 11, a lever support plate 131 is fastened by bolts to the right side surface of the hydraulic case 110. A guide groove hole 132 is formed in an upper portion side of the lever support plate 131, the guide groove hole 132 being formed into a circular arc shape having the rotary support shaft 112 as a center. A shaft portion of a friction bolt 133 is slidably inserted to the guide groove hole 132 of the lever support plate 131, the friction bolt 133 being fixed to the working machine elevating lever 14. A spacer 134 is arranged between the lever support plate 131 and the working machine elevating lever 14, and a friction plate 135 is arranged in a left side surface of the lever support plate 131. The shaft portion of the friction bolt 133 is passed through the spacer 134 and the friction plate 135. A pair of washers 136 are fitted to the shaft portion of the friction bolt 133, and two sets of disc springs 137, totally four disc springs 137 are fitted between both the washers 136. Further, double nuts 138 are screwed and fitted to a leading end side of the shaft portion.

The friction plate 135 is pressure attached to the lever support plate 131 while using elastic restoring force of the disc springs 137 by fastening the double nuts 138, and the lever support plate 131 and the working machine elevating lever 14 are pinched by the friction plate 135 and a head portion of the friction bolt 133. Retaining force (brake force) retaining the working machine elevating lever 14 at a predetermined operation position is adjusted by adjusting the elastic restoring force of the disc springs 137 in connection with the screwing action of the double nuts 138.

As is apparent from the description mentioned above and FIGS. 7 to 11, in the agricultural tractor 1 provided with the travel machine body 2 to which the engine 5 and the transmission case 17 are mounted, the lift arm 30 which is provided in the rear portion side of the upper surface of the transmission case 17 so as to freely oscillate up and down, and the elevating hydraulic cylinder 29 which oscillates up and down the lift arm 30, and having the elevating hydraulic cylinder 29 externally attached to the rear portion side of the transmission case 17, the hydraulic case 110 accommodating the elevating hydraulic switch valve 103 in relation to the elevating hydraulic cylinder 29 is provided in the upper surface of the transmission case 17, and the variable throttle and stop valve 104 and the relief valve 105 are provided in the upper surface side of the hydraulic case 110, the variable throttle and stop valve 104 adjusting the falling speed of the lift arm 30, and the relief valve 105 being positioned between the elevating hydraulic cylinder 29 and the variable throttle and stop valve 104. As a result, in spite of the fact that it is possible to shorten the piping 106 from the elevating hydraulic switch valve 103 to the elevating hydraulic cylinder 29 via the variable throttle and stop valve 104, it is possible to improve the maintenance workability in comparison with the structure in which the variable throttle and stop valve 104 and the relief valve 105 can be provided within the transmission case 17, and it is possible to help suppression of the maintenance cost.

As is apparent from the description mentioned above and FIGS. 7 to 11, the rotary support shaft 112 of the operation member 14 and the feedback operation shaft 122 are constructed as the double shaft structure, and are axially supported to the hydraulic case 110, the operation member 14 being provided for manually switching the elevating hydraulic switch valve 103 and the feedback operation shaft 122 being connected to the lift arm 30 via the feedback link 123, the operation member 14 and the feedback link 123 are arranged collectively in one side of the right and left sides of the hydraulic case 110, and the hydraulic pump 101 supplying the working fluid to the elevating hydraulic cylinder 29 is arranged in the opposite side to the operation member 14 and the feedback link 123 in relation to the hydraulic case 110 on the upper surface of the transmission case 17. As a result, it is possible to compactly arranged the hydraulic case 110, the feedback link 123, the operation member 14, and the hydraulic pump 101 while effectively utilizing the space on the transmission case 17.

As is apparent from the description mentioned above and FIGS. 7 to 11, the rotating motion supporting point portion 34 of the lift arm 30 is close to the double shaft structures 112 and 122 of the hydraulic case 110. As a result, it is possible to achieve the shortening of the length of the feedback link 123 and it is possible to contribute to the suppression of the parts cost.

The present invention is not limited to the embodiment mentioned above, but can be embodied into various aspects. The structure of each of the portions is not limited to the illustrated embodiment, but can be variously changed within the range which does not deflect from the scope of the present invention.

REFERENCE SIGNS LIST

2 Travel machine body
5 Engine
14 Working machine elevating lever
17 Transmission case
29 Elevating hydraulic cylinder
30 Lift arm
34 Lift arm shaft (rotating motion supporting point portion)
100 Hydraulic circuit
101 Hydraulic pump for working machine
103 Elevating hydraulic switch valve
104 Variable throttle and stop valve
105 Damage preventing relief valve
106 Working fluid passage
107 Branch oil passage
110 Hydraulic case
111 Elevating mechanism
112 Rotary support shaft
122 Feedback operation shaft
123 Feedback link
130 Seesaw link

The invention claimed is:

1. An agricultural tractor comprising:
a travel machine body to which an engine and a transmission case are mounted;
a lift arm which is provided in a rear portion side of an upper surface of the transmission case so as to freely oscillate up and down;
an elevating hydraulic cylinder which oscillates up and down the lift arm; and
rear axle cases which protrude laterally outward from the transmission case;
wherein an upper portion side of the elevating hydraulic cylinder is connected to the lift arm; and
wherein a lower portion side of the elevating hydraulic cylinder is supported by the travel machine body,
wherein the lower portion side of the elevating hydraulic cylinder is axially supported rotatably via a laterally directed pivot pin shaft by a left hitch portion and a right hitch portion, and a bracket portion which is integrally formed in a rear surface of the transmission case so as to protrude backward;
wherein the left hitch portion is integrally formed in said left rear axle case so as to protrude backward, and the right hitch portion is integrally formed in said right rear axle case so as to protrude backward;
wherein base end sides of a pair of right and left lower links for installing a ground working machine are axially supported rotatably to a laterally long sideways lower link pin shaft which is supported by said left hitch portion and right hitch portion; and
wherein a tubular body controlling a lateral movement of the front end sides of both the right and left lower links is fitted to a longitudinally midstream portion of the lower link pin shaft, and a pair of right and left plates protruding backward are attached to the tubular body, and to each plate is connected the base end side of a sway chain in relation to each of the lower link, and the front end of each sway chain is connected to the left and right inner side closer to the tip of each corresponding lower link.

* * * * *